United States Patent
Hirano

(10) Patent No.: US 9,835,972 B2
(45) Date of Patent: Dec. 5, 2017

(54) IMAGE FORMING APPARATUS HAVING LIGHT SCANNING APPARATUS, AND INCLUDING A PLURALITY OF IMAGE FORMATION MODES

(71) Applicant: CANON KABUSHIKI KAISHA, Tokyo (JP)

(72) Inventor: Masayuki Hirano, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/113,941

(22) PCT Filed: Feb. 23, 2015

(86) PCT No.: PCT/JP2015/056015
§ 371 (c)(1),
(2) Date: Jul. 25, 2016

(87) PCT Pub. No.: WO2015/129906
PCT Pub. Date: Sep. 3, 2015

(65) Prior Publication Data
US 2016/0349660 A1    Dec. 1, 2016

(30) Foreign Application Priority Data
Feb. 27, 2014   (JP) .................................. 2014-036627

(51) Int. Cl.
G03G 15/00 (2006.01)
G03G 15/043 (2006.01)
(Continued)

(52) U.S. Cl.
CPC .............. *G03G 15/043* (2013.01); *B41J 2/47* (2013.01); *B41J 2/473* (2013.01); *G02B 26/10* (2013.01); *H04N 1/113* (2013.01)

(58) Field of Classification Search
CPC ........... G03G 15/043; B41J 2/473; B41J 2/47; G02B 26/10; H04N 1/113
(Continued)

(56) References Cited

U.S. PATENT DOCUMENTS

2006/0285186 A1    12/2006   Ishida et al.
2010/0238261 A1     9/2010   Maeda
(Continued)

FOREIGN PATENT DOCUMENTS

JP    H05201105 A    8/1993
JP    H10253914 A    9/1998
(Continued)

OTHER PUBLICATIONS

International Search Report issued in International Application No. PCT/JP2015/056015 dated May 26, 2015. Form PCT/ISA/210 and PCT/ISA/220.
(Continued)

*Primary Examiner* — Billy Lactaoen
(74) *Attorney, Agent, or Firm* — Rossi, Kimms & McDowell LLP

(57) ABSTRACT

An image forming apparatus has a light scanning apparatus which is capable of aligning a lens with a plurality of light-emitting devices and forming a high-quality image while suppressing generation of moiré. In a first image formation mode, light-emitting devices outputting light beams exposing both ends of the photosensitive member in a rotational direction and at least a part of light-emitting devices exposing an area between exposure positions of the light-emitting devices outputting the light beams exposing the both ends are used to form an electrostatic latent image on the photosensitive member. In a second image formation mode, the light-emitting devices outputting the light beams exposing both ends are not used, and at least a part of light-emitting devices exposing an area between exposure positions of the light-emitting devices outputting the light beams exposing both ends are used to form the electrostatic latent image on the photosensitive member.

1 Claim, 17 Drawing Sheets

(51) Int. Cl.
*B41J 2/47* (2006.01)
*G02B 26/10* (2006.01)
*H04N 1/113* (2006.01)

(58) Field of Classification Search
USPC .................................................. 399/4, 32, 51
See application file for complete search history.

(56) References Cited

U.S. PATENT DOCUMENTS

| | | | |
|---|---|---|---|
| 2011/0043879 A1 | 2/2011 | Inagaki | |
| 2013/0271551 A1 | 10/2013 | Yasaki | |
| 2014/0036020 A1* | 2/2014 | Ishihara | G03G 15/0435 347/224 |

FOREIGN PATENT DOCUMENTS

| | | | |
|---|---|---|---|
| JP | 2003094722 A | 4/2003 |
| JP | 2007171457 A | 7/2007 |
| JP | 2010214892 A | 9/2010 |
| JP | 2011043754 A | 3/2011 |
| JP | 2013237260 A | 11/2013 |

OTHER PUBLICATIONS

Written Opinion issued in International Application No. PCT/JP2015/056015 dated May 26, 2015. Form PCT/ISA/237.
Office Action issued in Japanese Application No. 2014-036627 dated Oct. 3, 2017.

\* cited by examiner

FAST MODE

LASER SELECTION MODE 2

LASER SELECTION MODE 3

LASER SELECTION MODE 4

*FIG. 11*

SELECTION OF LASER SELECTION MODE

PLEASE SELECT ONE FROM LASER SELECTION MODES BELOW

LASER SELECTION MODE 2 — 902
LASER SELECTION MODE 3 — 903
LASER SELECTION MODE 4 — 904

| LASER SELECTION SIGNAL | IMAGE FORMATION MODE | LASER SELECTION MODE |
|---|---|---|
| 0 | FAST MODE | — |
| 2 | HIGH QUALITY MODE | LASER SELECTION MODE 2 |
| 3 | HIGH QUALITY MODE | LASER SELECTION MODE 3 |
| 4 | HIGH QUALITY MODE | LASER SELECTION MODE 4 |

| LASER SELECTION SIGNAL | IMAGE FORMATION MODE | MEMORY |
|---|---|---|
| 0 | FAST MODE | — |
| 2 | HIGH QUALITY MODE | 010 |
| 3 | HIGH QUALITY MODE | 011 |
| 4 | HIGH QUALITY MODE | 011 |

IMAGE FORMING APPARATUS HAVING LIGHT SCANNING APPARATUS, AND INCLUDING A PLURALITY OF IMAGE FORMATION MODES

TECHNICAL FIELD

The present invention relates to an image forming apparatus having a light scanning apparatus having a plurality of light-emitting devices which output light beams for forming an electrostatic latent image on a photosensitive member.

BACKGROUND ART

In recent years, for image forming apparatuses such as copiers and printers, there has been a demand to form high-quality images at high speed, and accordingly, image forming apparatuses which expose a photosensitive member to light by outputting a plurality of laser beams (light beams) from a plurality of light-emitting devices have been adopted. Image forming apparatuses have achieved high-quality image formation by increasing the resolution to, for example, 2400 dpi and have achieved high-speed image formation by forming an electrostatic latent image through irradiation of a photosensitive member with a plurality of laser beams (for example, 16 beams) in one scan.

However, when the resolution is, for example, 2400 dpi, the intervals between laser beams in a rotational direction of a photosensitive member is 10.5 µm. When 16 laser beams are used to scan a photosensitive member, a range of one scan in the rotational direction of the photosensitive member is expressed by the following equation, 10.5 (µm)×16=168 µm, and the resolution in one scan period is about 25.4 (mm)/168 (µm)≈150 dpi. Namely, the resolution in the scan period is 150 dpi, and the spatial frequency in one scan is such a frequency as to be visually identifiable, and hence generation of moiré may occur due to a strip-shaped region in one scan and a screen.

For this reason, there has been proposed an image forming method which has a fast mode in which an image is formed by exposing a photosensitive member to light with, for example, 16 beams from all light-emitting devices, and a high-quality mode in which an image is formed by exposing the photosensitive member to light with, for example, 12 beams from a reduced number of light-emitting devices, and the modes are switched according to situations.

In image forming apparatuses, however, the relative positions of optical paths of lasers and optical lenses and mirrors are conventionally adjusted during assembly of the image forming apparatuses before shipment so that the shapes and sizes of spots of laser beams guided onto a photosensitive member can satisfy product specifications.

FIG. 17 is a view showing an image corresponding to an electrostatic latent image formed on a photosensitive member using a plurality of laser beams passing through an area near the center of a lens in a direction vertical to a scanning direction of laser beams and a direction of an optical axis of the lens in an image forming apparatus. FIG. 18 is a view showing an image corresponding to an electrostatic latent image formed on a photosensitive member using a plurality of laser beams including light beams passing through an edge of a lens in a direction vertical to a scanning direction of laser beams and a direction of an optical axis of the lens in an image forming apparatus.

As shown in FIG. 17, for example, in a four-beam scan system, when all laser beams pass through an area near the center of a lens to make an adjustment so that the aberration of the lens can be small, spots 1500 to 1503 of respective laser beams on a photosensitive member are in focus as indicated by (a) in FIG. 17. In this case, as indicated by (b) in FIG. 17, the light quantities of all the laser beams are uniform, and hence a uniform image is formed in one scan as indicated by (c) in FIG. 17. Thus, by making an adjustment so that all laser beams can pass through an area near the center of a lens so as to make lens aberration small, pitch variations in a sub-scanning direction are reduced, and interference between pitch variations and a screen is suppressed.

In reality, however, since an fθ lens and a cylindrical lens have a manufacturing error or a placement error, it is difficult to match the optical axes of laser beams and a generating line of a lens with accuracy. Thus, for example, as shown in FIG. 18, when laser beams output from $LD_n$ to $LD_{n-3}$, which are light-emitting devices, pass through areas successively apart from the center of a lens, aberration gradually increases. As indicated by (a) in FIG. 18, with respect to a spot 1603 of the laser beam from the $LD_n$, a spot 1602 of the laser beam from the $LD_{n-1}$, a spot 1601 of the laser beam from the $LD_{n-2}$, and a spot 1600 of the laser beam from the $LD_{n-3}$, successively increase in spot diameter on a photosensitive member.

In this case, as indicated by (b) in FIG. 18, the light quantity of a laser beam decreases from the $LD_n$ to the $LD_{n-3}$ in this order, and as a result, as indicated by (c) in FIG. 18, a nonuniform image is formed even in one scan. FIG. 19 shows an example in which the density of an image periodically changes in a sub-scanning direction (a rotational direction of a photosensitive member). Due to interference between such image density variations in the sub-scanning direction and a screen, generation of moiré occurs, leading to a problem of bringing about degradation in the quality of an output image.

To solve this problem, for example, there has been proposed a light scanning apparatus having an adjustment device that moves a lens so as to adjust the positions at which a plurality of laser beams falls upon the lens (see PTL (Patent Literature) 1).

CITATION LIST

Patent Literature

{PTL 1} Japanese Laid-Open Patent Publication (Kokai) No. H10-253914

SUMMARY OF INVENTION

Technical Problem

However, when an image forming apparatus is of a type that changes the way of using laser beams according to image formation modes, a problem explained hereafter arises. The scan speed and the light quantities of light-emitting devices are adjusted with a decrease in the number of laser beams, and hence the distribution of light quantities in a sub-scanning direction is emphasized due to the effect of beam spot blur caused by lens aberration. As a result, pitch variations in a sub-scanning period and a screen are likely to interfere with each other, and generation of moiré is likely to occur.

The present invention provides an image forming apparatus having a light scanning apparatus, which is capable of aligning a lens with a plurality of light-emitting devices and then forming a high-quality image while suppressing generation of moiré.

Solution to Problem

Accordingly, in a first aspect of the present invention, there is provided an image forming apparatus comprising a photosensitive member configured to be rotated, a light source including a plurality of light-emitting points including at least three light-emitting points which output light beams exposing the photosensitive member so as to form an electronic latent image on the photosensitive member, the plurality of light-emitting points being arranged such that a plurality of light beams output from the plurality of light-emitting points expose different areas in a rotating direction of the photosensitive member, a deflection unit configured to deflect the plurality of light beams so that the plurality of light beams scans the photosensitive member, a lens configured to guide the plurality of light beams deflected by the deflection unit onto the photosensitive member, and a control unit configured to control the light source based on an image formation mode selected from a plurality of image formation modes, wherein the plurality of image formation modes include a first image formation mode in which among the plurality of light-emitting points, light-emitting points which output light beams exposing both ends of the photosensitive member in the rotating direction and at least a part of light-emitting points exposing an area between exposure positions of the light-emitting points which output the light beams exposing the both ends are used to form the electrostatic latent image on the photosensitive member, and a second image formation mode in which among the plurality of light-emitting points, the light-emitting points which output the light beams exposing the both ends are not used and at least a part of light-emitting point exposing an area between exposure positions of the light-emitting points which output the light beams exposing the both ends are used to form the electrostatic latent image on the photosensitive member, and the control unit controls the light-emitting points, corresponding to the first image formation mode or the second image formation mode, based on image data.

Advantageous Effects of Invention

According to the present invention, an image formation mode in which light-emitting points which output light beams exposing both ends of the photosensitive member in the rotational direction among a plurality of light beams and at least a part of light-emitting points exposing an area between exposure positions of the light-emitting points which output the light beams exposing the both ends are used to form an electrostatic latent image on the photosensitive member, and an image formation mode in which light-emitting points exposing an area between exposure positions of the light-emitting points which output the optical beams exposing the both ends are used to form an electrostatic latent image on the photosensitive member without using the light-emitting points which output the light beams exposing the both ends are selectively used. By selecting an appropriate mode, lens aberration is reduced to suppress generation of moiré and form high-quality images.

The features and advantages of the invention will become more apparent from the following detailed description taken in conjunction with the accompanying drawings.

BRIEF DESCRIPTION OF DRAWINGS

FIG. 11 is a view showing a laser selection mode selecting screen displayed on the operating unit.

FIG. 14 is a view showing the relationship among an image formation mode, a laser selection mode, and a laser selection signal determined based on them.

DESCRIPTION OF EMBODIMENTS

Embodiments will now be described in detail with reference to the drawings.

Figure 1:
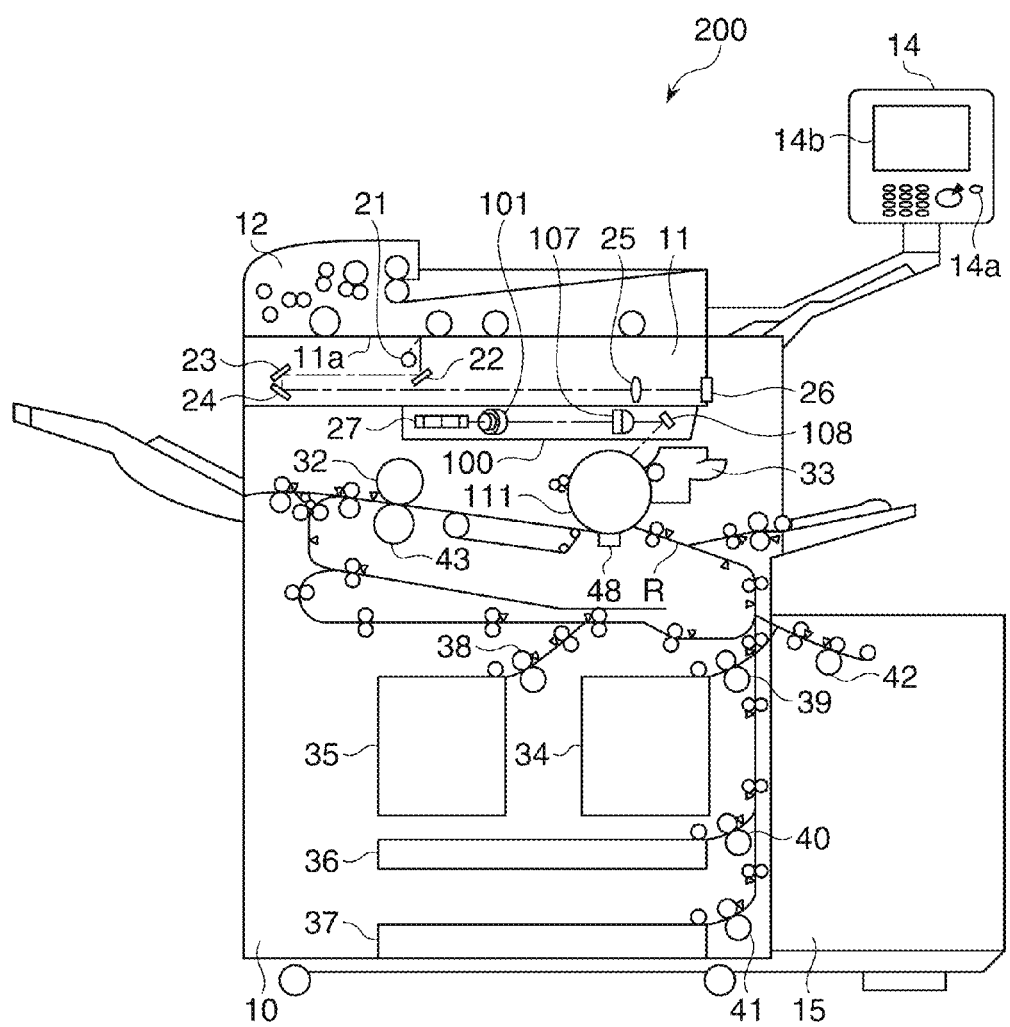
FIG. 1 is a cross-sectional view schematically showing an arrangement of an image forming apparatus according to a first embodiment.

FIG. 1 is a cross-sectional view schematically showing an arrangement of an image forming apparatus according to a first embodiment.

Referring to FIG. 1, the image forming apparatus 200 is comprised of a printer unit 10 that forms images on recording sheets, a scanner unit 111 that is disposed on top of the printer unit 10 and reads data of an image on an original, and an automatic original feeder 12 disposed on top of the scanner unit 11. An operating unit 14 is provided in an upper part of the image forming apparatus 200.

The operating unit 14 has a setting unit 14a and a display unit 14b. By setting an image formation mode and others using the setting unit 14a of the operating unit 14, a user causes the image forming apparatus 200 to run. The user also displays various setting values on the image forming apparatus 200 and the present job status on the display unit 14b of the operating unit 14. When a trouble occurs in the image forming apparatus 200, for example, a serviceperson call is displayed on the display unit 14b, and when a jam occurs in the image forming apparatus 200, for example, a position of a recording sheet stuck in the image forming apparatus 200 is displayed on the display unit 14b.

The printer unit 10 has an image forming unit that forms images on recording sheets which are recording media, and the image forming unit has a photosensitive drum 111 which is a photosensitive member, and a developing device 33, a light scanning apparatus 100, and a transfer device 48 which are placed around and in opposed relation to the photosensitive drum 111. The light scanning apparatus 100 has a semiconductor laser 101, a polygon mirror 27 which is a rotary polygon mirror, a lens 107, and a mirror 108. A conveying path R for conveying a recording sheet to the image forming unit and sheet-feeding cassettes 34, 35, 36, and 37 in which recording sheets are stored are provided below the image forming unit.

A high-capacity paper deck 15 is detachably provided on an outer side face of the printer unit 10. The user is allowed to freely divide recording sheets among the sheet-feeding cassettes 34 to 37 and the paper deck 15 according to sheet sizes. The sheet-feeding cassettes 34 to 37 and the paper deck 15 are equipped with sheet-feeding conveying rollers 38, 39, 40, 41, and 42 driven by respective motors, not shown, and a recording sheet is fed by the corresponding one of the sheet-feeding conveying rollers and conveyed to the image forming unit by way of the conveying path R. On the conveying path R, a fixing device having a fixing roller 32 and a pressurizing roller 43 is disposed downstream of the image forming unit.

The scanner unit 11 on top of the printer unit 10 has an original platen glass 11a, a light source 21 which is disposed below the original platen glass 11a and moves from side to side as viewed in FIG. 1, mirrors 22 to 24 which receive reflected light radiated from the light source 21 and reflected on an original surface, a lens 25, and a CCD 26. The reflected light received by the mirrors 22 to 24 forms an image on the CCD 26 through the lens 25. In the CCD 26, the formed optical image is converted into an electric signal, which in turn is stored as digital image data in an image memory of an image control unit, not shown.

The automatic sheet feeder 12 disposed on top of the scanner unit 11 has an original tray on which originals are placed, and a plurality of conveying rollers which convey and feed the originals on the original tray one by one to the original platen glass 11a.

Figure 2:
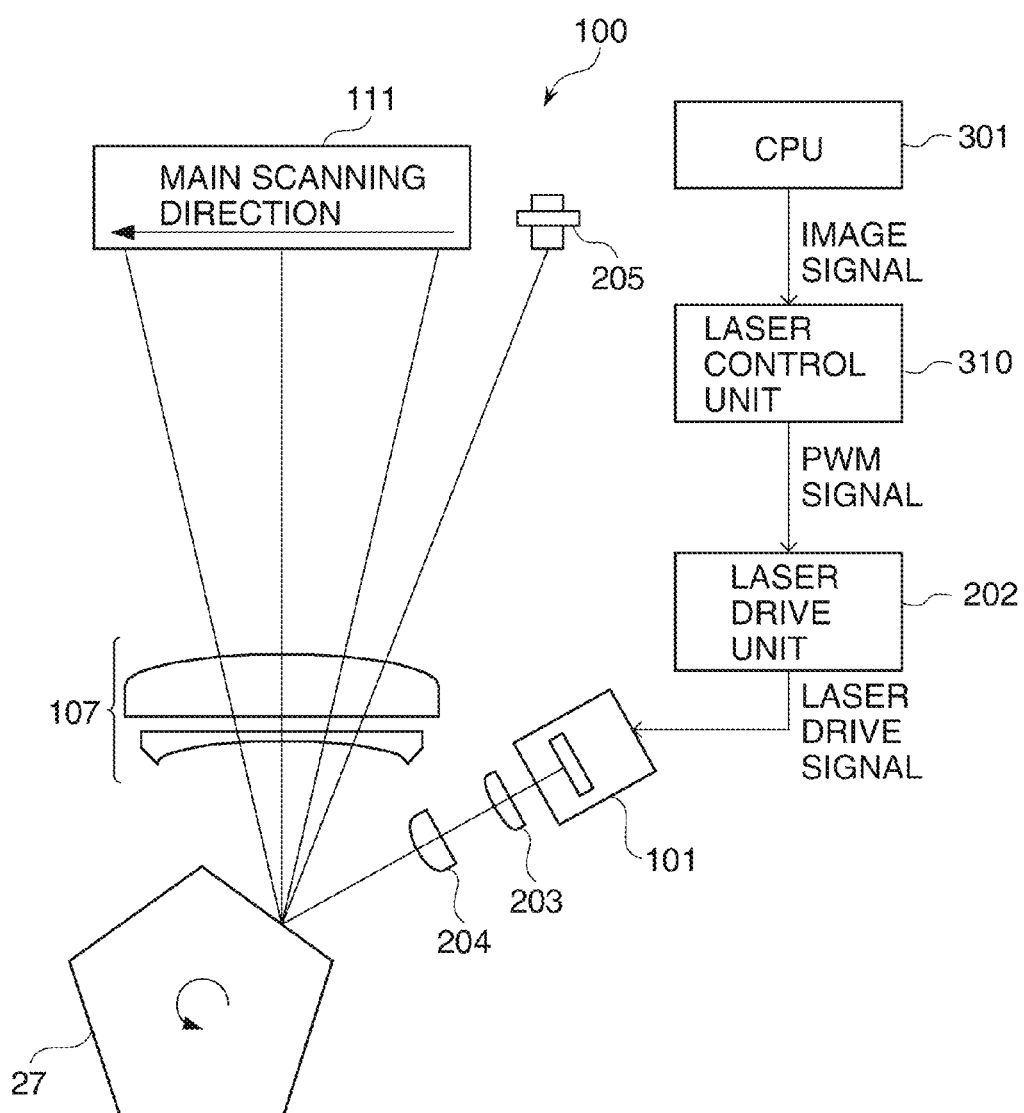
FIG. 2 is a diagram schematically showing an arrangement of a light scanning apparatus in the image forming apparatus in FIG. 1.

FIG. 2 is a diagram schematically showing an arrangement of the light scanning apparatus 100 in the image forming apparatus 200 in FIG. 1. Referring to FIG. 2, the light scanning apparatus 100 is comprised mainly of a semiconductor laser 101, a polygon mirror 27, an fθ lens 107, and a collimator lens 203 and a cylindrical lens 204 disposed on an optical path between the semiconductor laser 101 and the polygon mirror 27. A CPU 301 is connected to the semiconductor laser 101 via a laser drive unit 202 and a laser control unit 310, to be described later.

Figure 3:
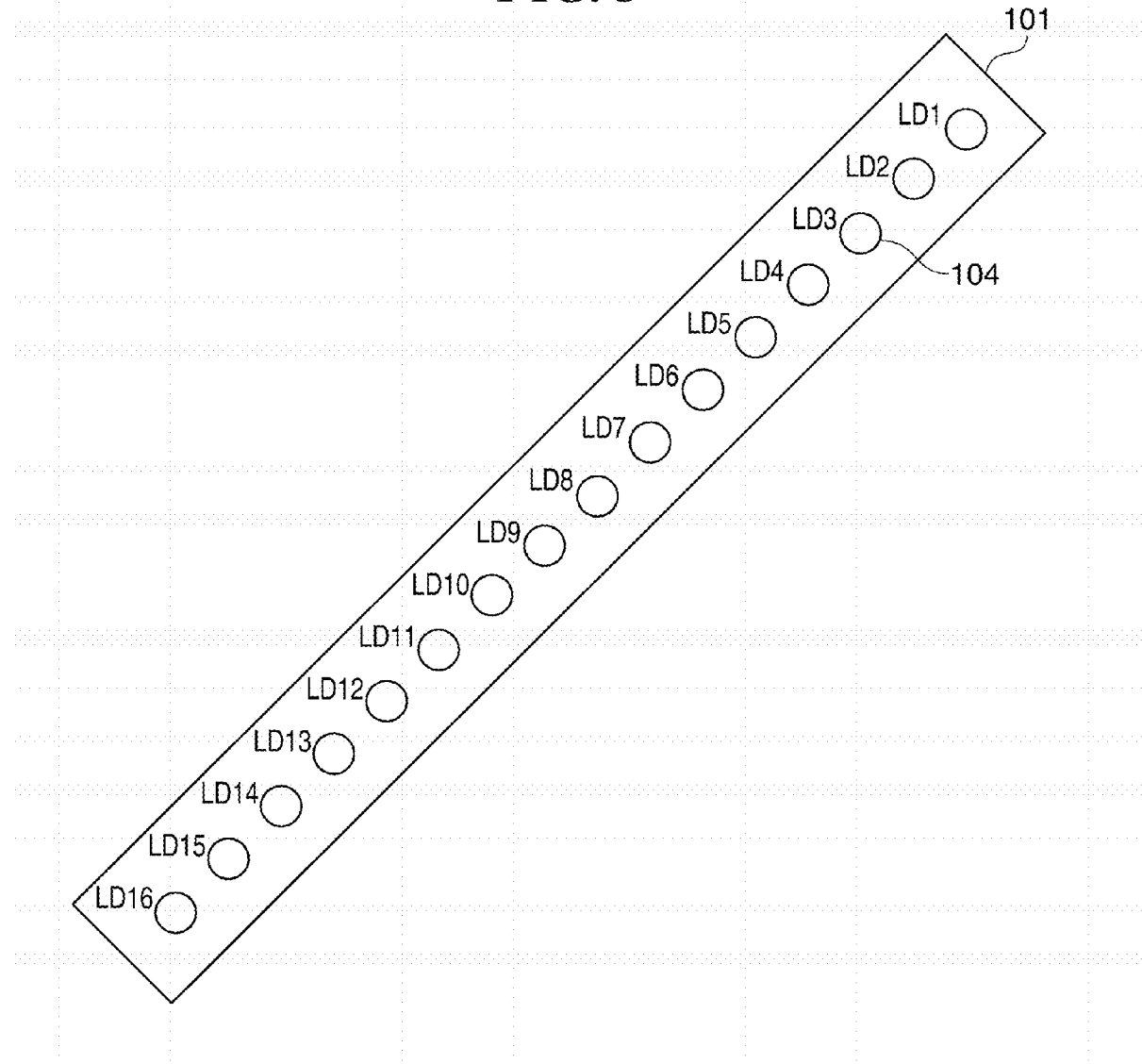
FIG. 3 is a view showing light-emitting devices provided in a semiconductor laser of the light scanning apparatus in the image forming apparatus in FIG. 1.

In the light scanning apparatus 100 constructed described above, an image signal stored in the image memory, not shown, is sent to the laser control unit 310 by the CPU 301 and converted into a PWM signal by the laser control unit 310. The PWM signal obtained by the conversion is sent to the laser drive unit 202, which in turn generates a laser drive signal from the PWM signal. Based on the generated laser drive signal, a laser beam which is an light beam is output from the semiconductor laser 101 toward the polygon mirror 27. As shown in FIG. 3, the semiconductor laser 101 has a plurality of i.e. at least three, for example, 16 light-emitting points (hereafter also referred to as "the light-emitting devices") (LD1 to LD 16) 104 disposed in a line as shown in FIG. 3.

Laser beams output from the semiconductor laser 101 are diffused light and thus converted into parallel pencils of light by the collimator lens 203 and caused to converge in a sub-scanning direction in the vicinity of the polygon mirror 27 by the cylindrical lens 204 to fall upon the polygon mirror 27. The polygon mirror 27 rotates at a constant angular velocity. Laser beams incident on the polygon mirror 27 are deflected by a reflecting surface. The laser beams deflected by the polygon mirror 27 pass through the fθ lens 107 which is an optical lens and scan a photosensitive drum (photosensitive member) at a constant speed.

It should be noted that a BD (Beam Detector) 205 disposed close to an end of the photosensitive drum 111 is an optical sensor which detects laser beams deflected by the polygon mirror 27. By detecting laser beams deflected by the polygon mirror 27, the BD 205 generates a BD signal which is a horizontal synchronous signal for synchronizing rotation of the polygon mirror 27 and an image signal.

Figure 4:
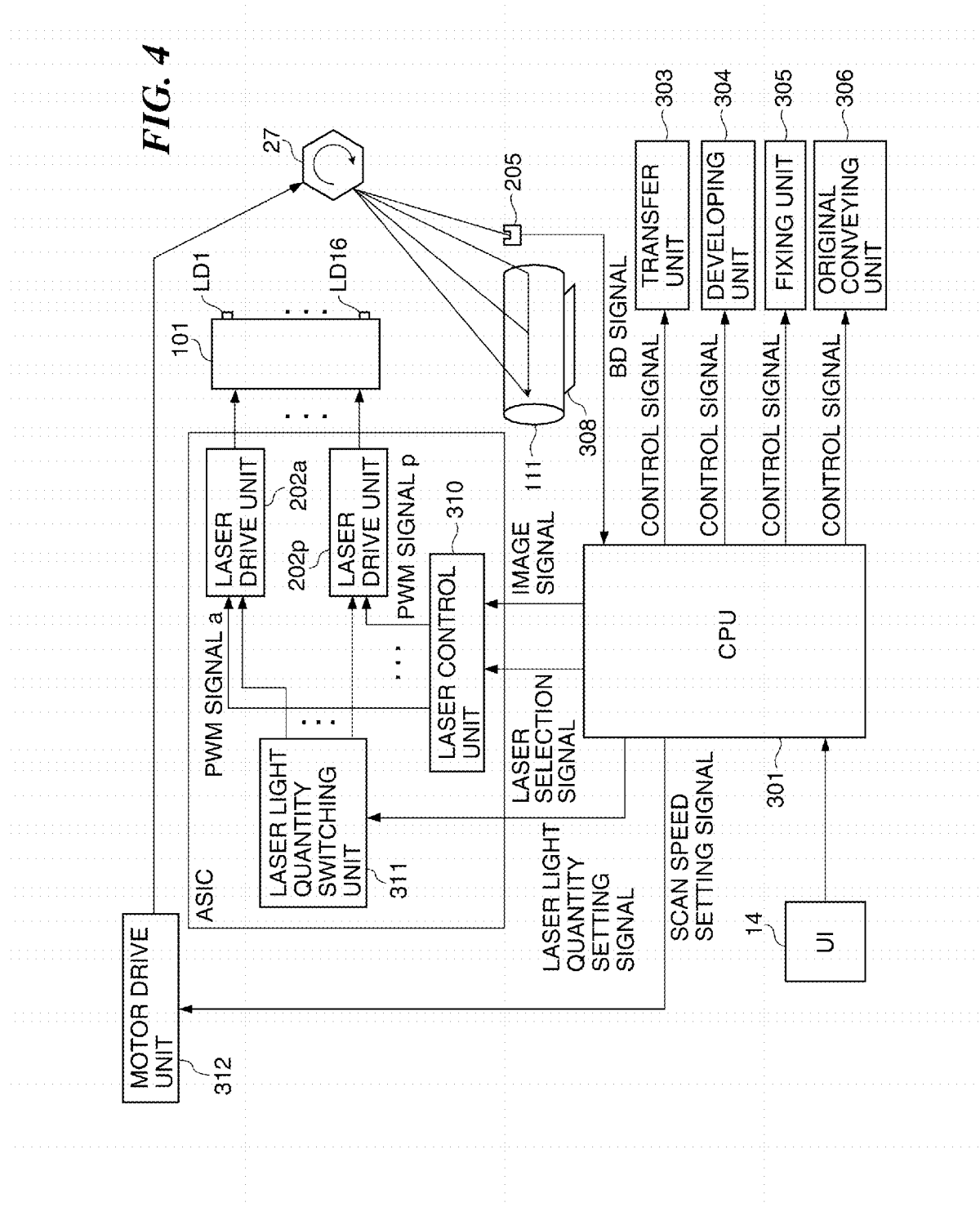
FIG. 4 is a block diagram schematically showing a control arrangement of the image forming apparatus in FIG. 1.

FIG. 4 is a block diagram schematically showing a control arrangement of the image forming apparatus 200 in FIG. 1.

Referring to FIG. 4, the image forming apparatus 200 has the CPU 301 which is a control unit, and the CPU 301 is connected to a transfer unit 303, a developing unit 304, a fixing unit 305, an original conveying unit 306, and the operating unit 14, which is a user interface, so as to communicate with each of them. The CPU 301 is also connected to the laser control unit 310 and connected to the semiconductor laser 101 via a laser drive unit 202a or 202p so as to communicate with each of them. The CPU 301 is connected to the polygon mirror 27 via a motor drive unit 312 so as to communicate with the polygon mirror 27 it and is also connected to the BD 205 so as to communicate with the BD 205. A laser light quantity switching unit 311 acts as a light quantity changing unit.

The CPU 301 controls the transfer unit 303, the developing unit 304, the fixing unit 305, and the original conveying unit 306. The CPU 301 generates image signals such as normal images and test image patterns, generates a laser selection signal based on information received from the operating unit 14, and sends the generated image signals and laser selection signal to the laser control unit 310. The CPU 301 generates and sends a laser light quantity setting signal based on information received from the operating unit 14 to control the laser light quantity switching unit 311, and generates and sends an operating speed setting signal to control the motor drive unit 312.

The laser control unit 310 converts an image signal from the CPU 301 into PWM signals, selects light-emitting devices for use based on a laser selection signal from the CPU 301, and outputs the PWM signals to the laser drive unit for the selected light-emitting devices. The laser drive unit 202a or 202p outputs laser beams from the semiconductor laser 101 in accordance with the supplied PWM signals and a laser light quantity setting signal from the laser light quantity switching unit 311.

The laser beams output from the semiconductor laser 101 are reflected on the reflecting surface of the polygon mirror 27 rotating at a constant angular velocity based on a scanning speed setting signal from the motor drive unit 312. The BD 205 detects the reflected laser beams and outputs a BD signal. The laser beams scan the photosensitive drum 111, which is rotatively driven based on the BD signal, to form an electrostatic latent image.

Figure 5:
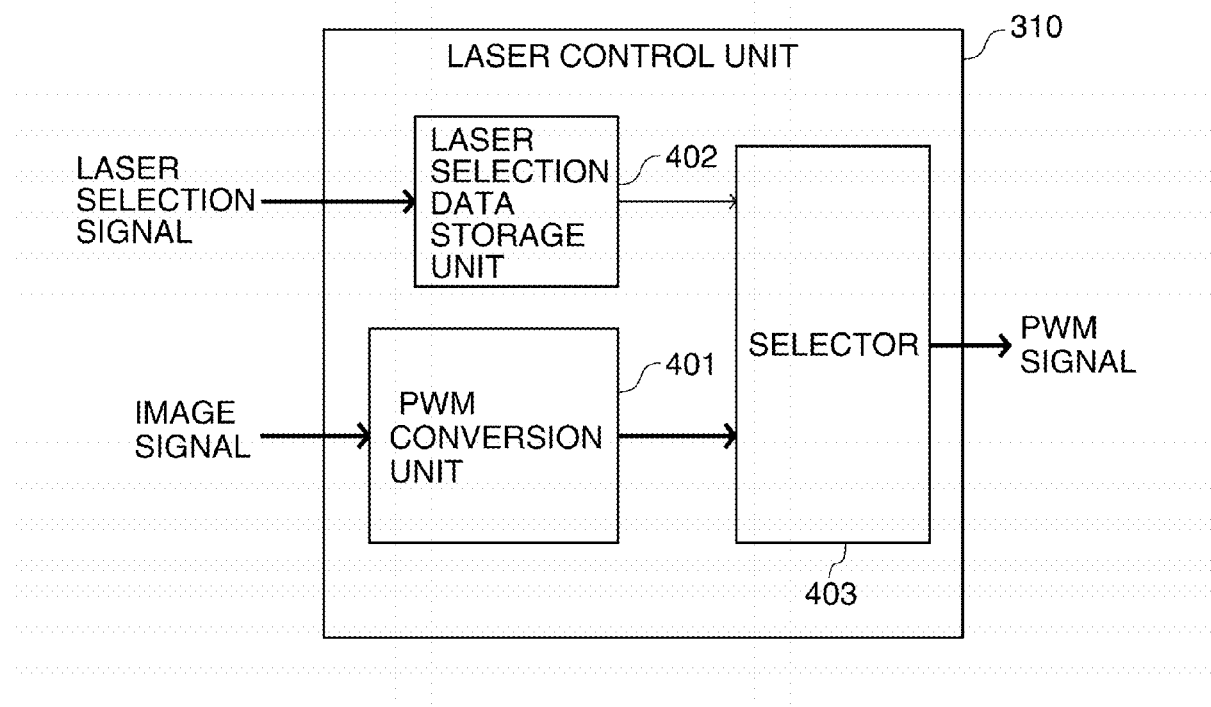
FIG. 5 is a block diagram schematically showing an arrangement of a laser control unit in FIG. 4.

FIG. 5 is a block diagram schematically showing an arrangement of the laser control unit 310 in FIG. 4. Referring to FIG. 5, the laser control unit 310 is comprised mainly of a selector 403 as well as a PWM conversion unit 401 and a laser selection data storage unit 402 which are connected to the selector 403 so as to communicate with it.

The PWM conversion unit 401 converts an image signal sent from the CPU 301 to the laser control unit 310 into PWM signals. For example, upon receiving an image signal for 16 beams, the PWM conversion unit 401 converts it into 16 PWM signals and outputs the PWM signals to the selector 403. Based on control information, to be described later, the laser selection data storage unit 402 receives a laser selection signal from the CPU 301, outputs it to the selector 403, and stores it as laser selection data.

The selector 403 chooses the PWM signals from the PWM conversion unit 401 based on the laser selection signal from the laser selection data storage unit 402, and as a result, determines light-emitting devices (hereafter referred to merely as "the LDs") for use among the plurality of light-emitting devices 104 of the semiconductor laser 101. It should be noted that the control information is information determined in an image formation mode determined in FIG. 7, to be described later, and in a laser selection mode selected in FIG. 11, to be described later.

In the image forming apparatus 200 described above, an original conveyed onto the original platen glass 11a by the automatic sheet feeder 12 or placed on the original platen glass 11a by the user is irradiated with irradiation light from the light source 21 of the scanner unit 11. The irradiation light is reflected on a surface of the original and passes through the mirrors 22, 23, and 24 and the lens 25 to form an optical image on the CCD 26.

The optical image formed on the CCD 26 is converted into an electric signal which is digital image data. In accordance with a request from the user, the image data is subjected to an image conversion process such as enlargement or reduction, and after the image conversion process, the image data is stored in the image memory of the image control unit, not shown.

The image control unit calls the image data stored in the image memory, converts it again from the digital signal into an analog signal, and outputs the analog signal to the light scanning apparatus 100. The light scanning apparatus 100 outputs a laser beam (light beam) corresponding to the received analog signal from the semiconductor laser 101 which is a light source and irradiates the photosensitive drum 111 with the laser beam passing through the polygon mirror 27, the fθ lens 107, and the mirror 108.

The photosensitive drum 111 has as its surface an optical conductive layer comprised of an organic optical conductor, and during a copy job, is rotatively driven at a fixed speed and receives laser light from the semiconductor laser 101, so that an electrostatic latent image is formed on the surface of the photosensitive drum 111. The electrostatic latent image formed on the photosensitive drum 111 is visualized as a toner image by toner supplied from the developing device 33.

On the other hand, a recording sheet is conveyed through the conveying path R from any of the sheet-feeding cassettes 34 to 37 or the paper deck 15 and supplied to the photosensitive drum 111 in accordance with the moving timing of the toner image. The toner image on the photosensitive drum 11 is transferred to the recording sheet due to a transfer bias applied from the transfer device 48. The recording sheet to which the toner image has been transferred is introduced into a nip between the fixing roller 32 and the pressuring roller 43, and the toner image that has not been fixed yet is fixed onto the recording sheet through the action of the fixing roller 32 and the pressuring roller 43. The recording sheet onto which the toner image has been fixed is discharged from the printer unit 10.

A detailed description will now be given of an image forming process using the image forming apparatus 200 in FIG. 1.

Figure 6:
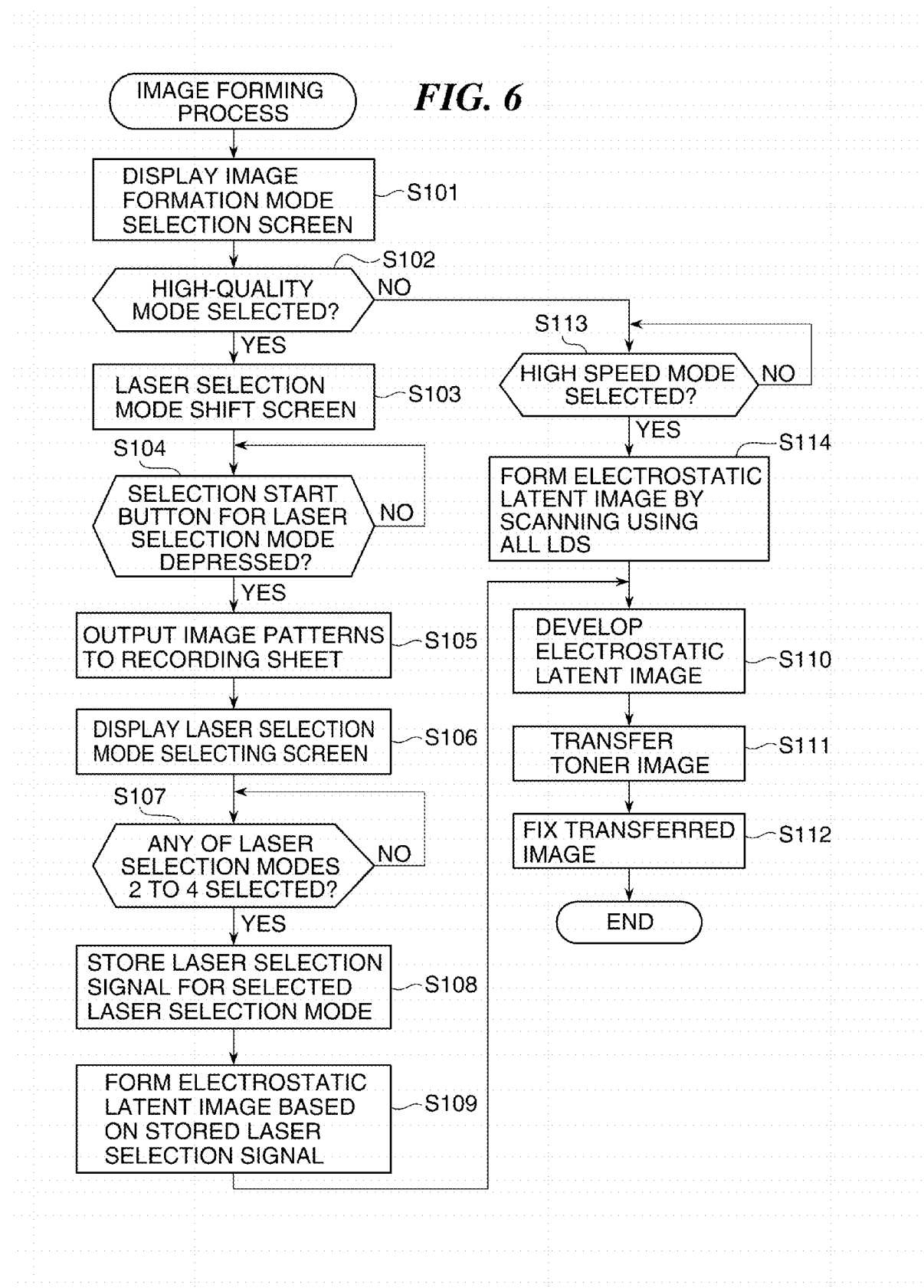
FIG. 6 is a flowchart showing the procedure of an image forming process using the image forming apparatus in FIG. 1.

FIG. 6 is a flowchart showing the procedure of the image forming process using the image forming apparatus 200 in FIG. 1. This image forming process is carried out by the CPU 301 of the image forming apparatus 200 in accordance with an image forming process procedure of an image forming process program stored on ROM, not shown.

Referring to FIG. 6, when the image forming process is started, first, the CPU 301 displays an image formation mode selection screen on the display unit 14b of the operating unit 14 (step S101).

Figure 7:
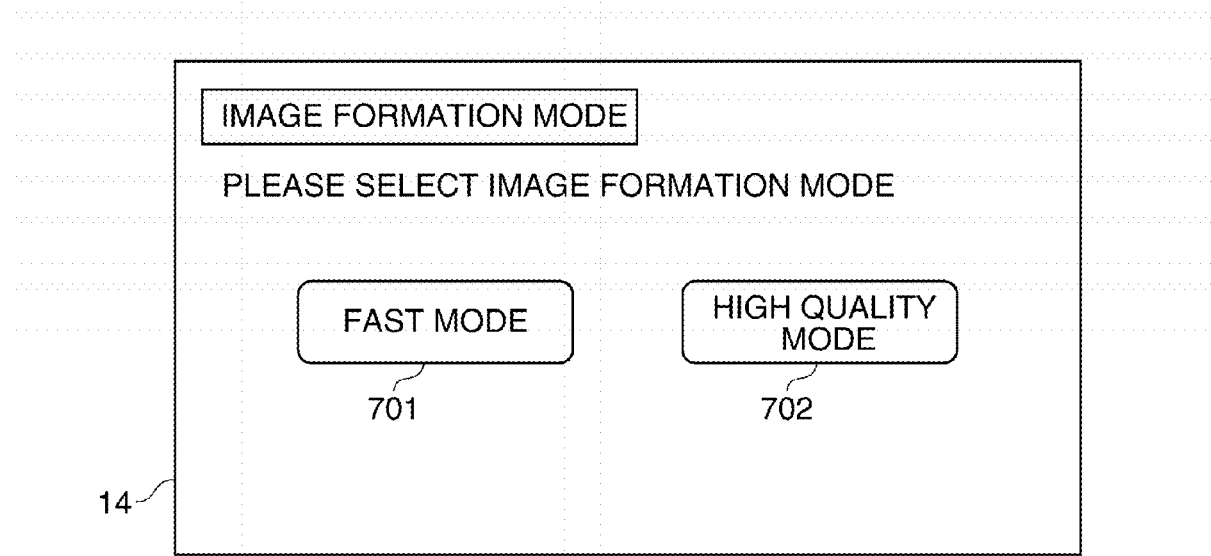
FIG. 7 is a view showing an image formation mode selection screen displayed on an operating unit.

FIG. 7 is a view showing the image formation mode selection screen displayed on the operating unit 14. Referring to FIG. 7, an indication for prompting selection of an image formation mode, and a fast mode button 701 and a high-quality mode button 702 are displayed on the image formation mode selection screen. The user selects an image formation mode by depressing the fast mode button 701 or the high-quality mode button 702. In the following description, a fast mode is referred to as a first image formation mode, and a high-quality mode is referred to as a second image formation mode.

The fast mode which is the first image formation mode is an image formation mode for use when high priority is placed on productivity, and in this mode, among a plurality of light-emitting devices, light-emitting devices outputting light beams exposing both ends of the photosensitive drum in the rotational direction and at least a part of light-emitting devices outputting light beams exposing an area between the both ends are used to form an electrostatic latent image on the photosensitive drum.

On the other hand, the high-quality mode which is the second image formation mode is an image formation mode for use when higher priority is placed on image quality than on productivity, and in this mode, among a plurality of light-emitting devices, at least a part of light-emitting devices outputting light beams exposing an area between both ends of the photosensitive drum in the rotational direction are used to form an electrostatic latent image on the photosensitive drum without using light-emitting devices outputting light beams exposing the both ends. In the high-quality mode, the sub-scan width in one scan is narrower than that in the fast mode.

Referring again to FIG. 6, the CPU 301 having displayed the image formation mode selection screen then determines whether or not the user has selected the high-quality mode (step S102). As a result of the determination in the step S102, when the high-quality mode has been selected ("YES" in the step S102), the CPU 301 displays a laser selection mode shifting screen on the operating unit 14 (step S103).

Figure 8:
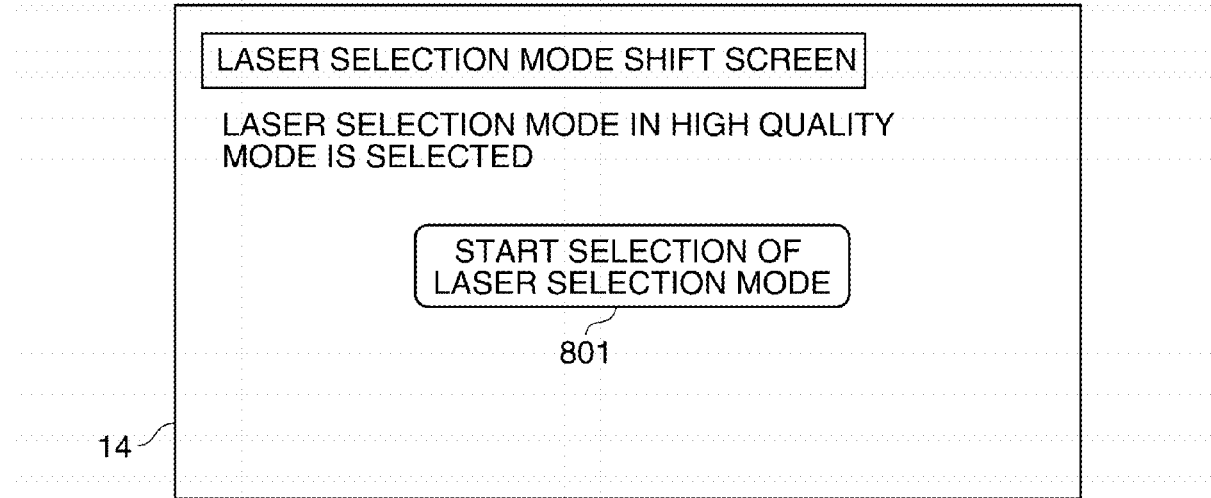
FIG. 8 is a view showing a laser selection mode shifting screen displayed on the operating unit.

FIG. 8 is a view showing the laser selection mode shifting screen displayed on the operating unit 14. Referring to FIG. 8, an indication for confirming the user's intent to select the laser selection mode for use in the high-quality mode, and a selection start button 801 for the laser selection mode are displayed on the laser selection mode shifting screen.

Referring again to FIG. 6, the CPU 301 having displayed the laser selection mode shifting screen stands by until the selection start button 801 for the laser selection mode is depressed (step S104). Then, after the user depresses the selection start button 801 for the laser selection mode ("YES" in the step S104), the CPU 301 then outputs test image patterns for the respective laser selection modes to a recording sheet (step S105).

Figure 9:
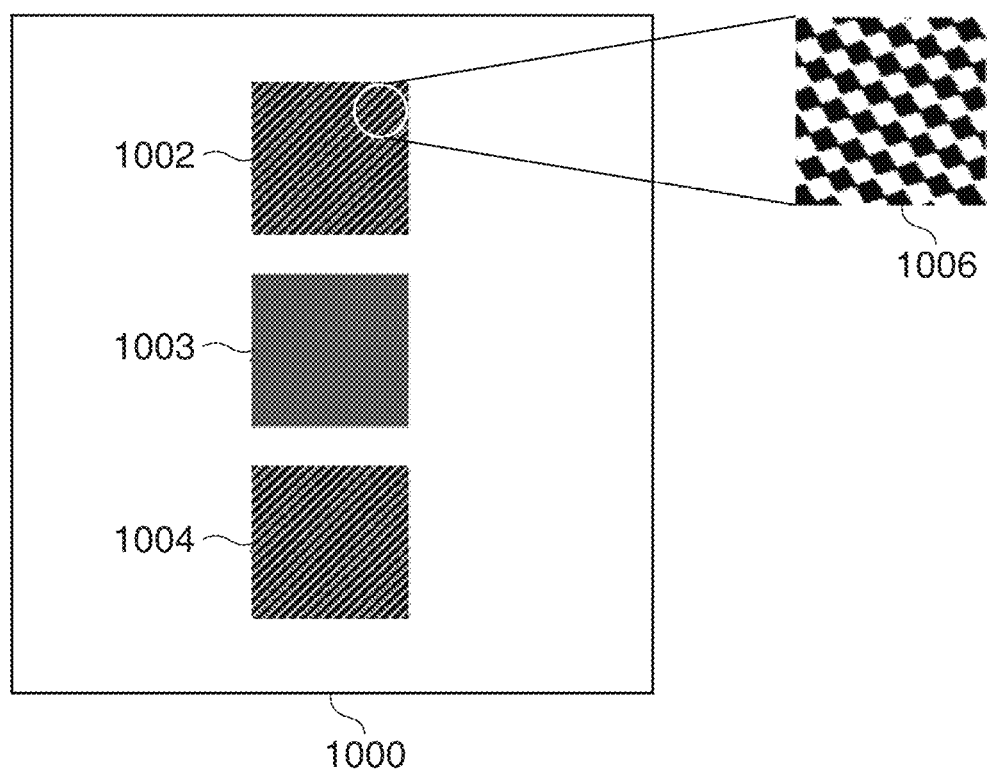
FIG. 9 is a view showing test image patterns corresponding to laser selection modes.

FIG. 9 is a view showing test image patterns corresponding to laser selection modes. Referring to FIG. 9, test image patterns 1002 to 1004 are recorded on a recording sheet 1000, and screens likely to interfere with 12-beam sub-scan pitches are chosen as screens used for the respective test image patterns. Using such screens likely to cause interference makes it possible to select a test image pattern which reliably avoids interference.

The test image patterns 1002 to 1004 corresponds to respective laser selection modes 2 to 4 determined based on the positional relationship between the fθ lens 107 and laser beams passing through the fθ lens 107 in the light scanning apparatus 100. Moiré shows up in the test image patterns 102 to 1004. On the other hand, no moiré shows up in the test image pattern 1003.

FIGS. 10A to 10D are schematic diagrams showing the positional relationship between an fθ lens and laser beams passing through the fθ lens 107 in the respective laser selection modes. Referring to FIGS. 10A to 10D, a light-emitting device rows comprised of light-emitting devices LD1 to LD16 and the fθ lens 107 are disposed in opposed relation to each other, and the laser selection modes 2 to 4 are classified based on the placement positions and number of LDs which are not in use for image formation. In FIGS. 10A to 10D, laser beams from LDs which are not in use for image formation are indicated by broken lines.

Figure 10A:
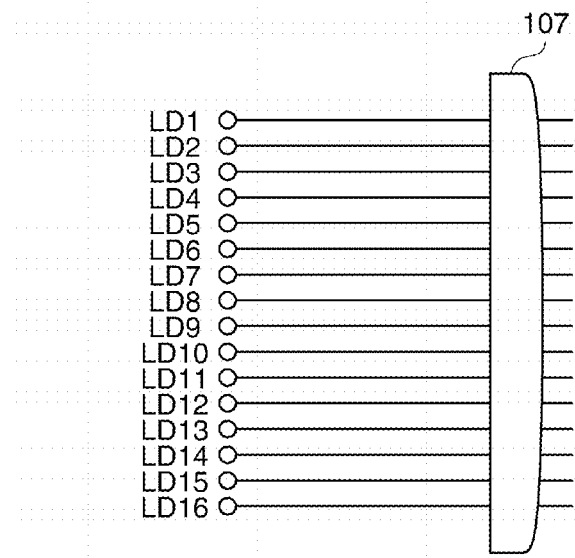
FIG. 10A is a schematic diagram showing the positional relationship between an fθ lens and laser beams in the respective laser selection modes.

FIG. 10A shows a mode in which all laser beams output from the light-emitting devices LD1 to LD16 pass through the fθ lens 107, and this is a fast mode in which an image is formed using all laser beams. On the other hand, FIGS. 10B to 10D show modes in which beams output from successive light-emitting devices except for a part of light-emitting devices placed at ends among the light-emitting devices LD1 to LD16 arranged in a row, e.g. 12 beams from 12 successive LDs pass through the fθ lens 107.

Figure 10B:
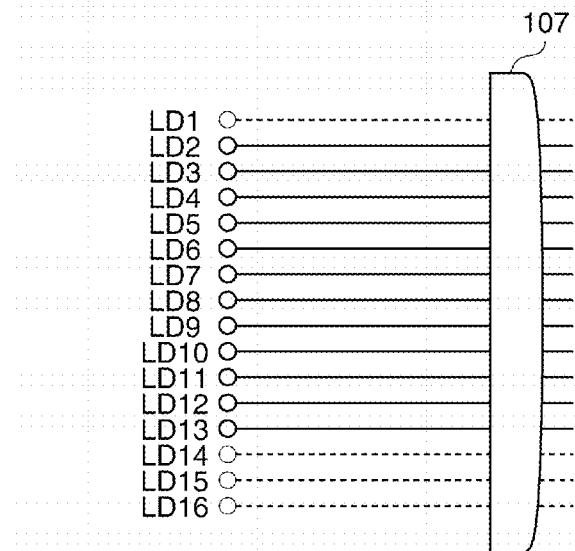
FIG. 10B is a schematic diagram showing the positional relationship between an fθ lens and laser beams in the respective laser selection modes.

Namely, FIG. 10B shows the laser selection mode 2 in which an image is formed using light-emitting devices except for one in upper and three in lower, i.e. 12 successive LD beams, and in this mode, the test image pattern 1002 in FIG. 9 is formed. FIG. 10C shows the laser selection mode 3 in which an image is formed using light-emitting devices except for two in upper and two in lower, i.e. 12 successive LD beams, and in this mode, the test image pattern 1003 in FIG. 9 is formed.

Figure 10C:
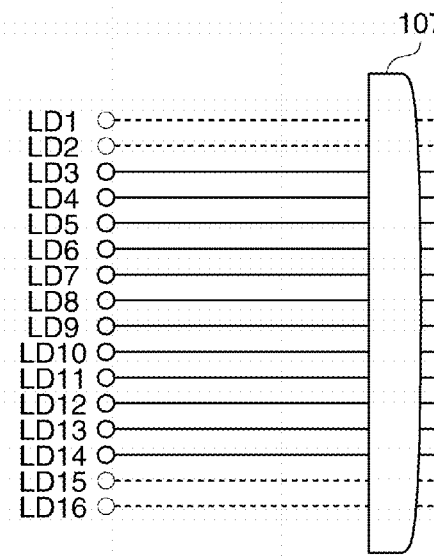
FIG. 10C is a schematic diagram showing the positional relationship between an fθ lens and laser beams in the respective laser selection modes.
Figure 10D:
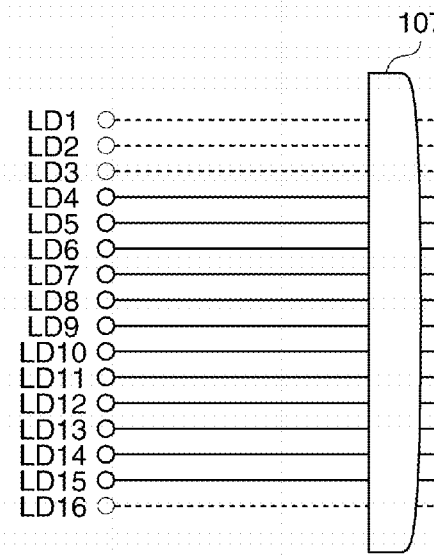
FIG. 10D is a schematic diagram showing the positional relationship between an fθ lens and laser beams in the respective laser selection modes.

Referring to FIG. 10C, laser beams output from the LD 3 and the LD 14 disposed at both ends of the light-emitting device row except for a part of light-emitting device which are not to be used in scanning the photosensitive drum pass through areas at equal distances from the center of the fθ lens 107. It should be noted that in FIG. 10C, the light-emitting device which are not to be used in scanning the photosensitive drum are the LD 1, the LD 2, the LD 15, and the LD 16. FIG. 10D shows the laser selection mode 4 in which an image is formed using light-emitting devices except for three in upper and one in lower, i.e. 12 successive LD beams, and in this mode, the test image pattern 1004 in FIG. 9 is formed.

When the number of beams is switched from, for example, 16 beams to 12 beams, the CPU 301 instructs the motor drive unit 312 to change the operating speed according to the number of beams and instructs the laser light quantity switching unit 311 to change the light quantity according to the changed scan speed. In response to the instruction from the CPU 301, the motor drive unit 312 changes the RPM of the polygon mirror 27, and in response to the instruction from the CPU 301, the laser light quantity switching unit 311 changes the light quantity to a predetermined light quantity.

Referring to FIG. 6 again, the CPU 301 having output test image patterns on a recording sheet then displays a laser selection mode selecting screen on the operating unit 14 so as to prompt the user to select a laser selection mode (step S106).

FIG. 11 is a view showing the laser selection mode selecting screen displayed on the operating unit 14. Referring to FIG. 11, an indication for prompting selection of a laser selection mode for use in the high-quality mode, and three buttons 902 to 904 corresponding to three modes from a laser selection mode 2 to a laser selection mode 4 are displayed. The user selects a laser selection mode corresponding to an image pattern with the smallest moiré from among the test image patterns 1002 to 1004 output on the recording sheet 1000 in FIG. 9.

Figure 12:
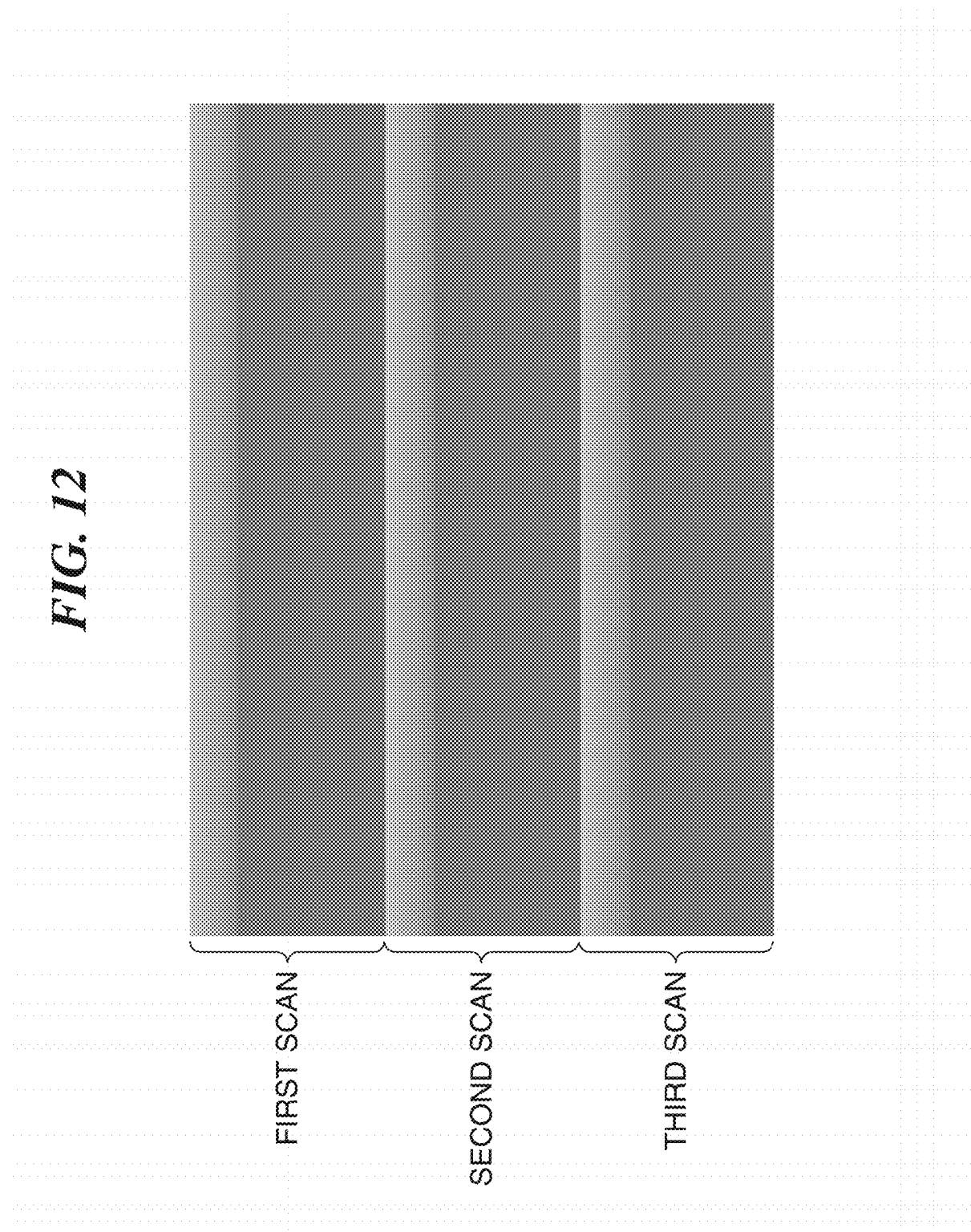
FIG. 12 is an enlarged view showing a test image pattern corresponding to the laser selection mode 1.

FIG. 12 is an enlarged view of the test image pattern 1002 corresponding to the laser selection mode 2. Referring to FIG. 12, there are pitch variations in the sub-scanning direction. As is apparent from FIG. 10B, one of the causes is that in the laser selection mode 2, a beam from the LD 2 passes through a place far away from the center of the fθ lens 107, and the aberration of the fθ lens 107 is large. Namely, in the laser selection mode 2, a beam from the LD 2 passes through a place far away from the center of the fθ lens 107. For this reason, the image density of a part of an electrostatic latent image, which is formed by a laser beam from the LD 2 in one scan, is lower than the other part.

Figure 13:
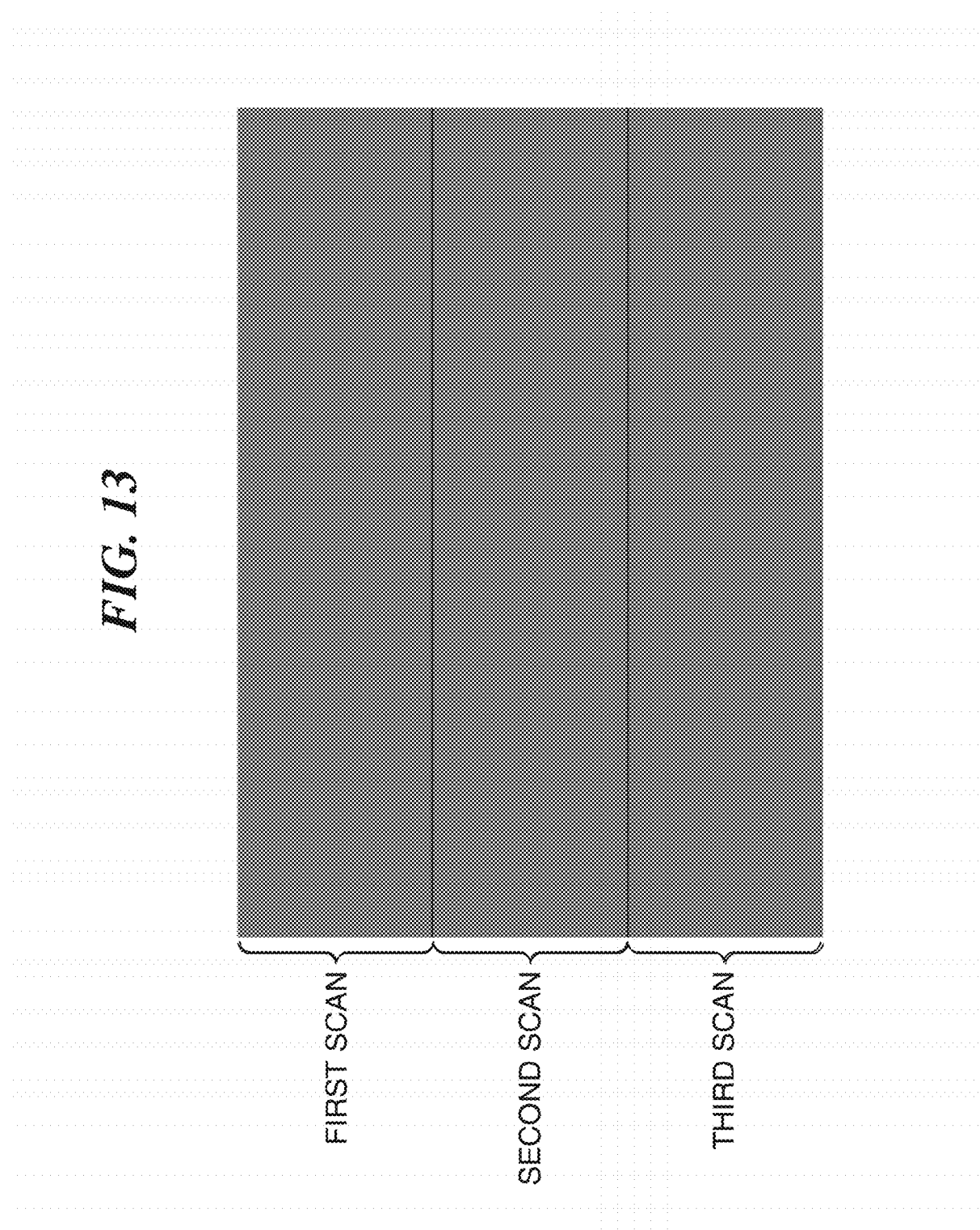
FIG. 13 is an enlarged view showing a test image pattern corresponding to the laser selection mode 3.

FIG. 13 is an enlarged view of the test image pattern 1003 corresponding to the laser selection mode 3. Referring to FIG. 13, the image densities of electronic latent images formed in one scan are stable. One of the causes is that all beams from the lasers LD 3 to LD 14 in use pass through places closer to the center of the fθ lens 107 than in other modes, and the aberration of the fθ lens 107 is thus reduced. In this case, the user selects the laser selection mode 3 corresponding to the test image pattern 1003 in FIG. 9 with the smallest moiré.

Referring to FIG. 6, the CPU 301 having displayed the laser selection mode selecting screen then stands by until it ascertains that the user has selected any of the laser selection modes 2 to 4 (step S107). The CPU 301 then ascertains that any laser selection mode has been selected ("YES" in the step S107), then determines a laser selection signal for the selected laser selection mode, and stores the laser selection signal in the selection data storage unit 402 (step S108).

FIG. 14 is a view showing the relationship among an image formation mode, a laser selection mode, and a laser selection signal determined based on them by the CPU 301. Referring to FIG. 14, when the image formation mode is the fast mode, all lasers are used to form an image, and hence no laser selection is made, and the laser selection signal assumes "0". On the other hand, when the image formation mode is the high-quality mode, laser selection is made, and the laser selection signal for the laser selection mode 2 assumes "2", and the laser selection signal for the laser selection mode 3 assumes "3". The laser selection signal for the laser selection mode 4 assumes "4".

Referring again to FIG. 6, after storing a laser selection signal, the CPU 301 causes the semiconductor laser 101 to output laser beams based on the stored laser selection signal, so that an electronic latent image is formed on a surface of the photosensitive drum 111 (step S109).

After forming the electrostatic latent image in the laser selection mode selected by the user, the CPU 301 develops the electrostatic latent image using the developing device 33 to obtain a toner image (step S110) and transfers the obtained toner image onto a recording sheet using the transfer device 48 (step S111). Thereafter, the CPU 301 brings the recording sheet, onto which the toner image has been transferred, into the fixing device, fixes the transferred image onto the recording sheet using the fixing roller 32 and the pressurizing roller 43, and terminates the sequential image forming process.

On the other hand, when the high-quality mode is not selected in the step S102 ("NO" in the step S102), the CPU 301 stands by until the fast mode is selected (step S113). The CPU 301 then ascertains in the step S113 that the fast mode has been selected, and thereafter, forms an electrostatic latent image on a surface of the photosensitive drum 111 by multi-beam scanning using all LDs of the semiconductor laser 101, for example, 16 LDs (step S114). After the electrostatic latent image is formed, the CPU 301 carries out development (step S110), transfer (step S111), and fixing (step S112) processes in the way described above and terminates the present image forming process.

According to the process in FIG. 6, when the user selects the high-quality mode, the laser selection mode selecting process in the steps S103 to S108 is carried out to prompt selection of a laser mode to be used. Namely, in the high-quality mode placing importance on image quality, an electrostatic latent image is formed using a plurality of successive laser beams except for laser beams passing through areas far away from the center of the fθ lens 107.

As a result, even when scanning is performed with a reduced number of beams after the lenses and the plurality of LDs are aligned, the aberration of the fθ lens is small, beams are in focus, and quantities of light are uniform, so that pitch variations and interference between pitch variations and a screen are suppressed. Therefore, high-quality images are formed while generation of moiré is suppressed.

Moreover, according to the present embodiment, since interference between pitch variations and a screen is suppressed, scanning with laser beams is performed while generation of moiré is suppressed even when the positional accuracy of the lenses and the plurality of LDs are adjusted relatively roughly, and therefore, satisfactory images are formed without bringing about degradation of image quality.

In the present embodiment, a photosensitive belt may be used in place of the photosensitive drum which is the photosensitive member.

A description will be now given of a second embodiment.

Figure 15:
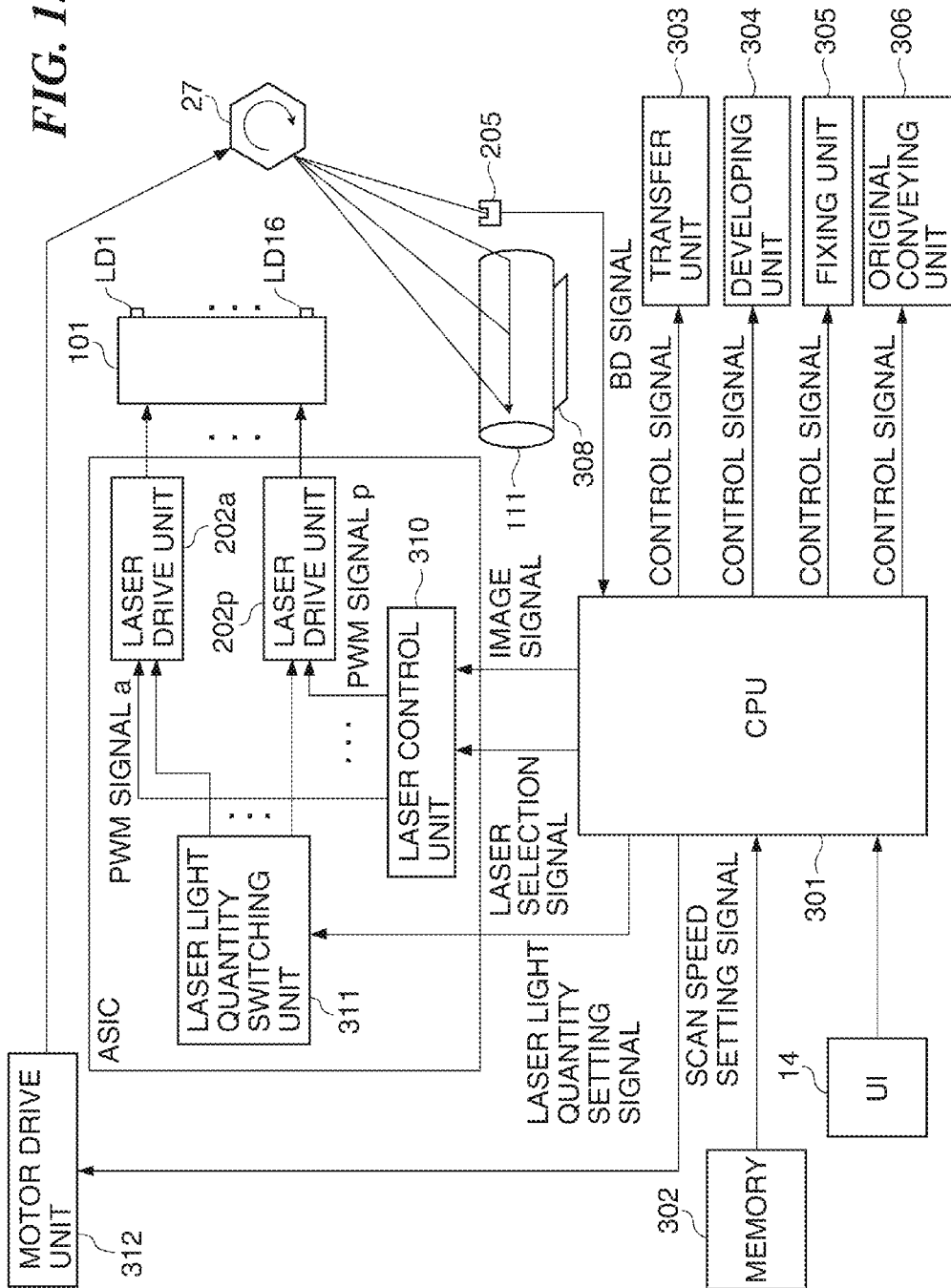
FIG. 15 is a block diagram schematically showing a control arrangement of an image forming apparatus according to a second embodiment.

FIG. 15 is a block diagram schematically showing a control arrangement of an image forming apparatus according to the second embodiment. The image forming apparatus according to the present embodiment is constructed by adding a memory 302 to the image forming apparatus according to the first embodiment, and in other respects, its construction and operation are the same as those in the first embodiment. Thus, in the following description, the same components as those in the first embodiment are designated by the same reference numerals, description thereof is omitted, and the present embodiment will be described with a focus on parts differing from those in the first embodiment.

Referring to FIG. 15, the memory 302 is connected to the CPU 301 so that they can communicate with each other. In the memory 302, for example, based on various measurement results obtained using jigs at factories before shipment, lots of lenses, and so on, information on the aberration of the fθ lens 107 caused by a plurality of laser beams, information on laser selection modes in the high-quality mode, and so on are written.

Figures 16, 17:
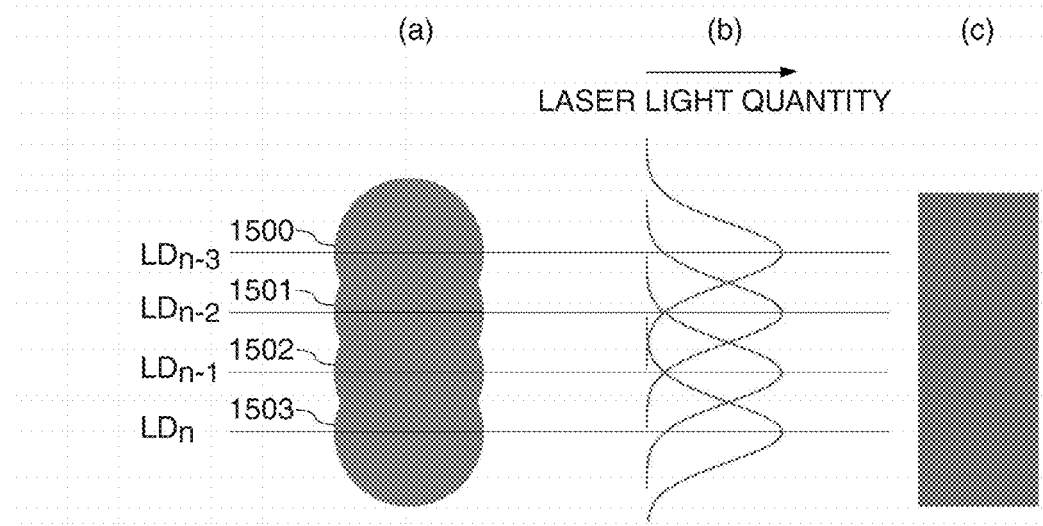
FIG. 16 is a view showing the relationship among an image formation mode, information on a laser selection mode stored in memory, and a laser selection signal determined based on them.
FIG. 17 is a view showing an image corresponding to an electrostatic latent image formed on a photosensitive member using a plurality of laser beams passing through an area near the center of a lens in a conventional image forming apparatus.
Figure 18:
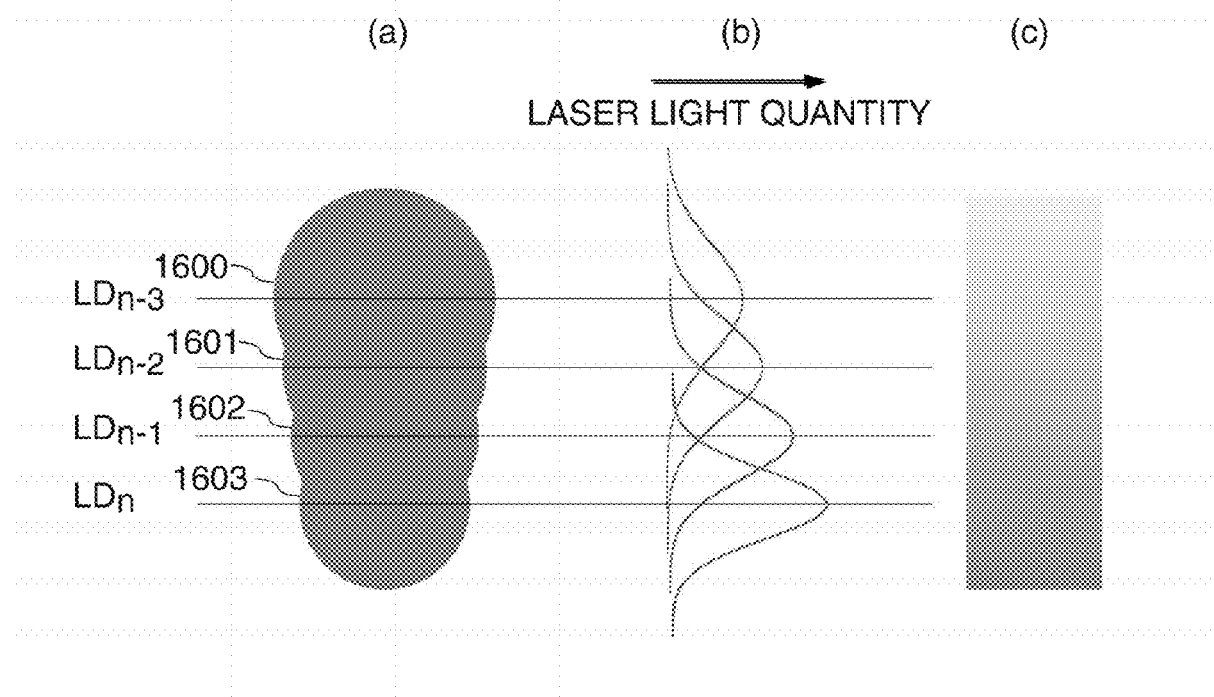
FIG. 18 is a view showing an image corresponding to an electrostatic latent image formed on a photosensitive member using a plurality of laser beams including light beams passing through an edge of a lens in a conventional image forming apparatus.
Figure 19:
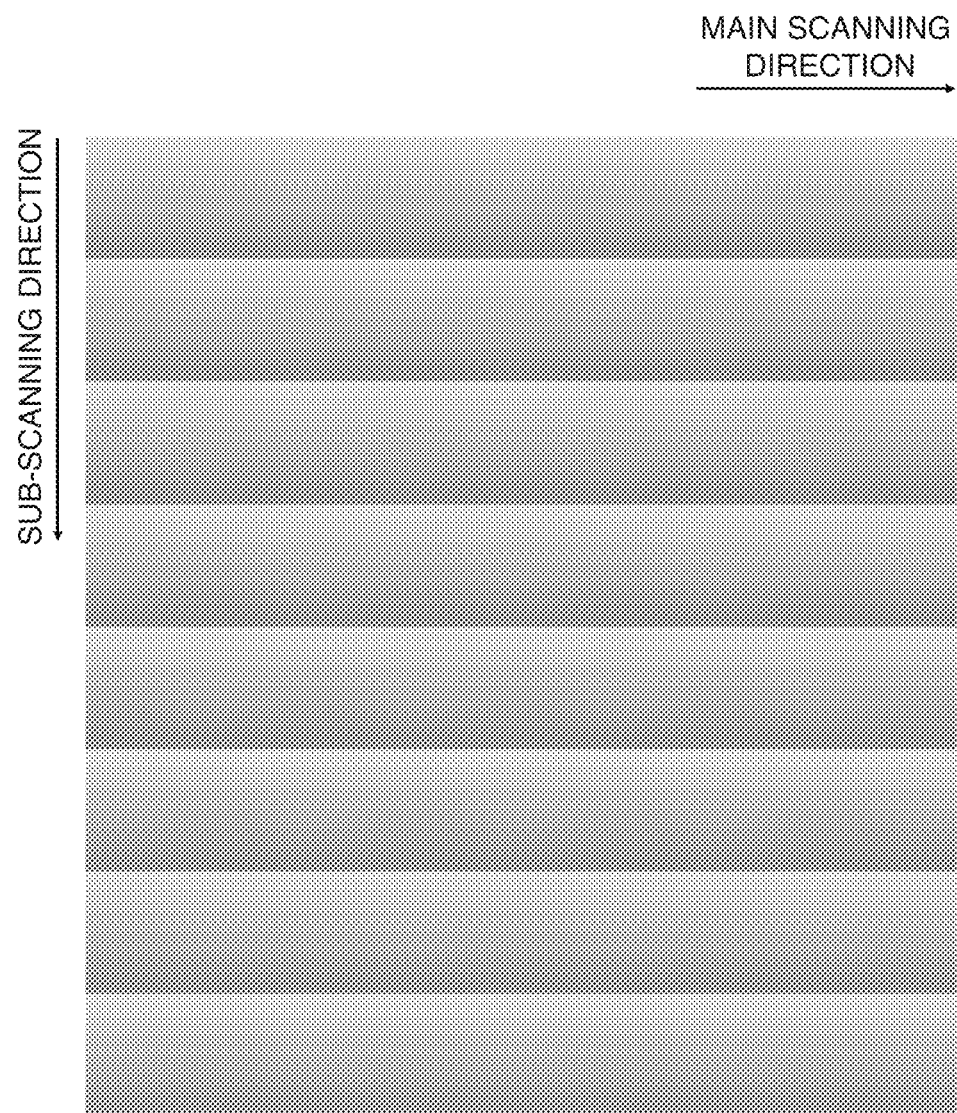
FIG. 19 is a view useful in explaining variations in scanning period in a sub-scanning direction, which occur in a conventional linage forming apparatus.

With this arrangement, when the high-quality mode is selected on the image formation mode selection screen in FIG. 7, the CPU 301 reads information on the laser selection modes written in the memory 302 and selects an optimum mode. Then, based on FIG. 16, the CPU 301 determines a laser selection signal corresponding to the optimum laser selection mode read from the memory 302. FIG. 16 is a view showing the relationship between an image formation mode, a laser selection mode stored in the memory 302, and a laser selection signal determined based on them by the CPU 301.

The CPU 301 having determined the laser selection signal for the optimum laser selection mode forms an electrostatic latent image on a surface of the photosensitive drum 111 based on the determined laser selection signal, and subsequently carries out an image forming process in the same way as in the first embodiment.

According to the present embodiment, the image forming apparatus 200 has the memory 302. In the memory 302, information on the aberration of the fθ lens 107 caused by beams output from the LD 1 to the LD 16 of the semiconductor laser 101 measured at a factory before shipment, information on a series of laser selection modes in the high-quality mode, and so on are written. Thus, when the high-quality mode is selected, a laser selection signal for use in the high-quality mode is determined based on the information stored in the memory 302, and as distinct from the first embodiment, the laser selection mode selecting process (the step S103 to S108) can be dispensed with.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

14 Operating unit
27 Polygon mirror
101 Semiconductor laser
104 Light-emitting device
107 Fθ lens
111 Photosensitive drum
204 Cylindrical lens
302 Memory
303 Transfer unit
304 Development unit
311 Laser light quantity switching unit
312 Scan speed changing unit

The invention claimed is:

1. An image forming apparatus comprising:
  a photosensitive member configured to be rotated;
  a light source including a plurality of light-emitting points including at least three light-emitting points which output light beams exposing the photosensitive member so as to form an electronic latent image on the photosensitive member, the plurality of light-emitting points being arranged such that a plurality of light beams output from the plurality of light-emitting points expose different areas in a rotating direction of the photosensitive member;
  a deflection unit configured to deflect the plurality of light beams so that the plurality of light beams scans the photosensitive member;
  a lens configured to guide the plurality of light beams deflected by the deflection unit onto the photosensitive member; a control unit configured to control the light source based on an image formation mode selected from a plurality of image formation modes; and
  a storage unit configured to store information on an aberration of the lens caused by the plurality of light beams output from the plurality of light-emitting points and information on the selection modes,
  wherein the plurality of image formation modes include a first image formation mode in which among the plurality of light-emitting points, light-emitting points which output light beams exposing both ends of the photosensitive member in the rotating direction and at least a part of light-emitting points exposing an area between exposure positions of the light-emitting points which output the light beams exposing the both ends are used to form the electrostatic latent image on the photosensitive member, and a second image formation mode in which among the plurality of light-emitting points, the light-emitting points which output the light beams exposing the both ends are not used and at least a part of light-emitting point exposing an area between exposure positions of the light-emitting points which output the light beams exposing the both ends are used to form the electrostatic latent image on the photosensitive member,
  the second image formation mode is classified into a plurality of selection modes based on placement positions and number of light-emitting points that are not used as light-emitting points outputting the light beams,
  the control unit controls the light-emitting points, corresponding to the first image formation mode or the second image formation mode, based on image data, and
  in a case where the user has selected the selection mode, the control unit generates a laser selection signal for the selected selection mode based on each of the information stored in the storage unit, and causes a plurality of light beams output from the plurality of light-emitting points based on the laser selection signal to scan the photosensitive member.

* * * * *